United States Patent [19]

d'Argembeau

[11] Patent Number: 4,592,594

[45] Date of Patent: Jun. 3, 1986

[54] BRUSHES AND THE MANUFACTURE THEREOF

[76] Inventor: Etienne Y. d'Argembeau, 24 Rue de Belle-Vue, B-1050 Brussels, Belgium

[21] Appl. No.: 563,265

[22] Filed: Dec. 20, 1983

Related U.S. Application Data

[62] Division of Ser. No. 356,703, Mar. 10, 1982, Pat. No. 4,441,227.

[30] Foreign Application Priority Data

Mar. 18, 1981 [LU] Luxembourg .............................. 83225

[51] Int. Cl.4 ........................... A46D 1/00; A46B 9/04
[52] U.S. Cl. .................................. 300/21; 15/159 A; 15/191 R; 15/167 R; 219/121 LF
[58] Field of Search ............. 15/159 R, 159 A, 167 R, 15/167 A, 104.93, 104.94, 171, 172, 174, 176, 190, 191 R, 193, 194; 401/283, 268, 282, 284, 285; 128/756; 300/21; 219/121 L, 121 LF, 121 LA, 121 LE

[56] References Cited

U.S. PATENT DOCUMENTS

| 2,244,615 | 6/1941 | Garcin ............................ | 15/167 A |
| 2,426,328 | 8/1947 | Wandel et al. .................... | 15/159 A |
| 2,554,777 | 5/1951 | Dangin .......................... | 15/159 A |
| 2,587,792 | 3/1952 | Von Sivers ...................... | 15/159 A |
| 2,672,640 | 3/1954 | Peterson et al. .................. | 15/159 A |
| 2,876,477 | 3/1959 | Stewart ......................... | 15/159 R X |
| 3,711,908 | 1/1973 | Broers .......................... | 219/121 LF |
| 4,256,948 | 3/1981 | Wolf et al. ..................... | 219/121 LE |

FOREIGN PATENT DOCUMENTS

| 100184 | 1/1937 | Australia ........................ | 15/191 R |
| 825856 | 12/1937 | France ........................... | 15/167 A |

Primary Examiner—Peter Feldman
Attorney, Agent, or Firm—Sughrue, Mion, Zinn, Macpeak and Seas

[57] ABSTRACT

The invention relates to a brush provided with bristles made of an organic thermoplastic synthetic material such as nylon, particularly a tooth-brush.

The free ends of the bristles which are sharp and therefore able to damage soft surfaces are made round by a heat treatment. The bristle ends are preferably submitted to a laser beam treatment, the source of laser beams being preferably placed below the bristle ends. Particularly, the brush and the heat source are submitted to a relative movement and the heat treatment takes place in an atmosphere of an inert gas.

The invention relates also to a brush, preferably a tooth brush, having a head carrying a plurality of monofilaments made of an organic thermoplastic synthetic material. The monofilaments are tangentially welded to each other in a hole provided in said head, so that a plurality of capillary channels is obtained, said channels being open, on the one hand, on the side where the filaments protrude from the brush head and, on the other hand, on the side of the brush head opposite to the side carrying the protruding monofilaments. Impurities may thus be removed through the open-ended capillary channels, when the brush is cleaned.

5 Claims, 4 Drawing Figures

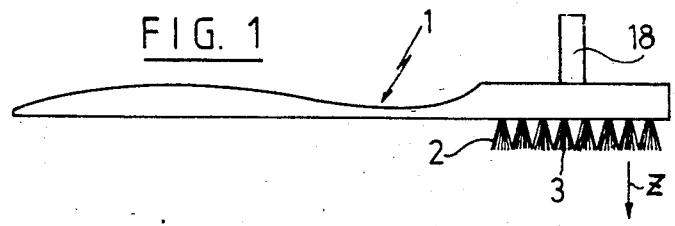
FIG. 1
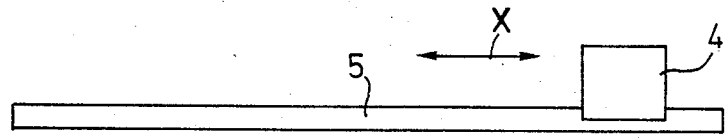
FIG. 2
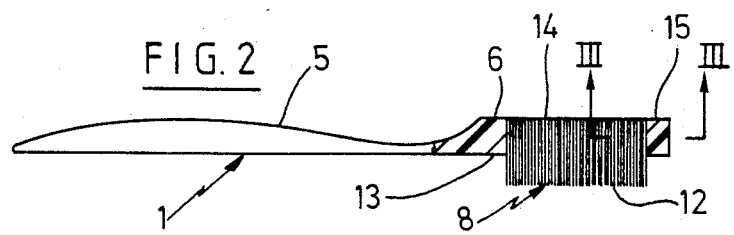
FIG. 3
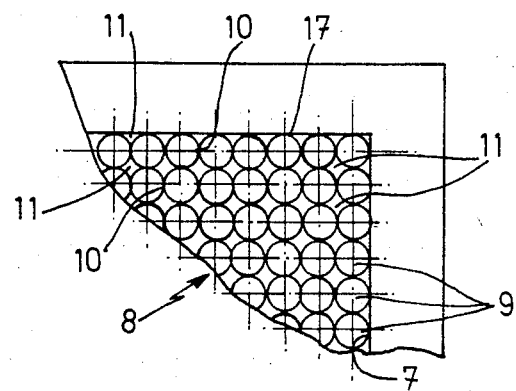
FIG. 4
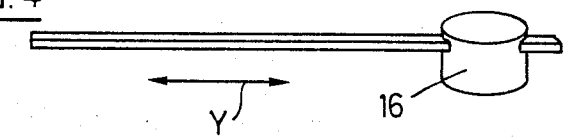
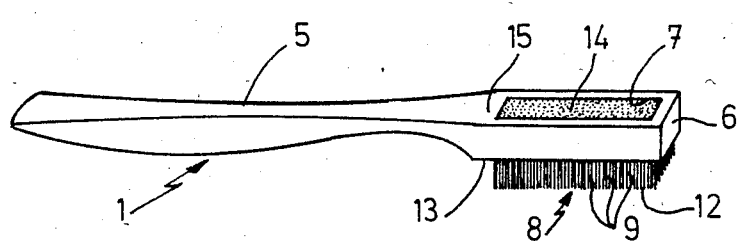

BRUSHES AND THE MANUFACTURE THEREOF

This application is a division, of application Ser. No. 356,703, filed Mar. 10, 1982, now U.S. Pat. No. 4,441,227.

FIELD OF THE INVENTION

This invention relates to improvements to brushes, particularly to brushes having bristles made of an organic thermoplastic synthetic material, such as nylon.

PRIOR ART

The known brushes comprising bristles made of an organic thermoplastic synthetic material are provided with bristles having a free end of such a shape that said bristles can damage and even scratch some surfaces with which they are contacted during brushing. Thus, some brushes, such as tooth-brushes or hair-brushes, have bristle ends which are sharp and injure the gums and the hair skin, particularly when said brushes have bristles made of an organic synthetic material with sharp free ends. In the same manner, the domestic brushes provided with bristles made of organic synthetic materials are generally useless, for example for brushing relatively soft surfaces, such as those of waxed floors or pavements, since the ends of the bristles cause damages to said surfaces.

Moreover, known brushes comprise a handle connected to a head carrying bristles made of an organic thermoplastic synthetic material, such as nylon, these bristles having frequently the shape of multifilament tufts embedded in said head.

A drawback of these known brushes, which may be tooth-brushes, is that, in spite of the cleaning treatments to which they are submitted, various materials accumulate at the bottom of the bristle tufts, this being of course harmful in respect of the cleanliness and in respect of the sanitary or hygienic point of view. Thus, in the case of tooth-brushes, particles resulting from the bacterial plate covering the tooth and removed therefrom during each brushing accumulate on the face carrying the bristles of the tooth-brush.

BRIEF DESCRIPTION OF THE INVENTION

An object of this invention is to provide a brush having bristles made of an organic thermoplastic synthetic material, in which the free end of the bristles have been treated so that they are no more sharp or keen, as well as process for obtaining such a brush.

Another object of the invention is to provide a brush adapted so that no accumulation of material of extrinsic origin, such as bacteria, occurs in the bristle tufts.

This invention relates therefore to brushes with bristles made of an organic thermoplastic synthetic material, in which the free ends of the bristles are rounded.

For obtaining the brushes with rounded bristle ends, said ends are submitted to a thermal treatment so as to cause a rounding of said ends by heating them at a temperature causing such a rounding, while avoiding the bristles to stick to each other by their free ends, possibly by using a fluid, such as water, between the bristles.

It has been found that it is possible to obtain brushes according to this invention, i.e. brushes in which the free ends of the bristles made of an organic thermoplastic synthetic material, such as nylon, are rounded so as to have a substantially hemispheric shape, when said bristle ends are submitted to the action of thermal beams emitted by a heat source placed under said bristle ends. In a particular embodiment of the process according to this invention, the free ends of the bristles made of an organic thermoplastic synthetic material, arranged so as to extend downwardly, are submitted to the action of a laser beam source placed under said free bristle ends, possibly with a relative movement between the bristle ends and the laser beam source, so that said beams sweep across the whole area provided with bristles of the brush.

The relative movement between the laser beam source and the bristle ends and the intensity of the laser beam source are adjusted so that the free ends of the bristles are softened, so as to take substantially the shape of a falling water drop, without causing a detaching of said rounded bristle ends, nor any sticking or adherence between the adjacent rounded bristle ends.

During the relative movement between the thermal beam source and the free ends of the brush bristles, said source and said ends are preferably maintained at a substantially constant distance from each other. Thus, the source of heat beams, such as laser beams, may be displaced or moved in a substantially horizontal direction with respect to the downwardly directed bristles of the brush which remain in a stationary position above said source of heat beams. On the contrary, the brush having its bristles extending downwardly in a vertical direction may be displaced in a substantially horizontal direction above the source of heat beams, such as laser beams.

The substantially constant distance between the source of heat rays or beams and the ends of the brush bristles may vary in accordance with variable features, such as the nature of the bristles, the spacing between their free ends, the nature of the source of thermal beams, the heat intensity of the beams emitted by the source and the like.

In respect of the possible relative movement between the source of heat beams and the bristles of the brush, the amplitude and the speed of said movement may also vary in accordance with various factors, such as the surface occupied by the end of the brush bristles.

The relative movement between the source of heat beams and the brush bristles may take place in the longitudinal direction of the surface occupied by the bristle ends and/or in the transverse direction of said surface.

The laser beam source may be used with a device for focussing the beams or without such a device.

In oder to give a regular round shape to the free bristle ends, it may be advantageous, according to this invention, to provide in the area in which the bristles are located a stream of a gas, preferably an inert gas, which submits said bristles to an aspiration preferably in the direction of the laser beams. The use of a suction stream of an inert gas, such as nitrogen, or the presence of an atmosphere of an inert gas is also advantageous since it avoids the scorching or burning of the bristles due to the heat produced by the heat source, such as the laser beam source.

This invention also relates to a brush comprising a handle and a head carrying bristles, in which said head carries a plurality of monofilaments which are substantially tangent to each other all along their length, so as to form between said monofilaments a plurality of capillary channels which are open, on the one hand, at the free end of the bristles and, on the other hand, on the side of the head opposite to the side thereof carrying protruding bristles. The monofilaments may be arranged in parallel rows the longitudinal and transverse axis of which are perpendicular or orthogonal to each other. The monofilaments of one row may also be staggered with respect to those of the adjacent row.

It has been found that the capillary channels formed between the monofilamentary bristles which are substantially tangent to each other allow a removal, by capillarity, of the various materials detached from the brushed surface. Thus, in the case of tooth-brushes, it has been found that the capillary channels allow the removal of bacteria resulting from the bacteria plate detached from the teeth during the brushing thereof.

According to an embodiment of the invention, the bristles are formed of a plurality of monofilaments made of an organic thermoplastic synthetic material, which cross or pass through the head of the brush and are tangentially welded to each other as well as to the brush head at their end opposite their free end, substantially in the plane of the brush head face opposite to the face carrying the protruding bristles.

This invention relates to a process for the manufacture of brushes of the type described in the two preceding paragraphs. According to this process, a multiplicity of monofilaments made of an organic thermoplastic synthetic material, such as nylon, are engaged into an elongated hole provided in the brush head, so that the monofilaments are tangent to each other all along their length and protrude on the desired distance with respect to one face of the head, the monofilaments are severed or cut flush with the opposite face of the head and the monofilaments are welded to each other and to said opposite face of the head, so that open capillary channels are formed at both ends between the monofilaments.

The welding of the tangent filaments to each other and to the brush head may be effected by heating means, for example by submitting the ends of the monofilaments, on the head side opposite to the side where these monofilaments protrude, to the action of heat beams emitted by a source, such as a laser beam source.

The welding of the monofilaments along their tangent lines and their contact lines with the material of the head, along the edge of the hole provided therein, is effected by arranging the source of heat beams or rays above the back face (i.e. the face opposite to the face carrying the protruding monofilaments) of the head in front of the hole filled up with monofilaments and by causing a relative movement between said source and said head, the distance between the source and the head, the intensity of the heat source and the speed of the relative movement between the head and the source being adjusted so as to cause said welding without obstructing said capillary channels, possibly due to the presence of a fluid, such as water, in the capillary channels, during the welding.

BRIEF DESCRIPTION OF THE DRAWINGS

FIG. 1 shows schematically how the process described below has been practised.

FIGS. 2, 3 and 4 show a tooth brush obtained by the process according to this invention.

DETAILED DESCRIPTION OF THE INVENTION

The following examples illustrate, in a nonlimitative manner, the method for obtaining brushes having bristles to which a round shape has been given.

EXAMPLES

In a first test, a tooth-brush has been used which comprised four parallel rows of nylon bristle tufts, each tuft comprising about 30 monofilaments of a diameter of about 0.2 mm, the tufts being at a distance of about 1 mm from each other at their free ends.

Said tooth-brush has been placed so that the ends of its bristle tufts are directed downwardly at a distance of about 4 cm from a laser beam source of the SAF type having a power of 300 watts reduced to about 20 watts, arranged under the protruding ends of the bristle tufts of the tooth-brush.

The source of laser beams adjusted at a power of 20 watts has been moved at a speed of 250 cm per minute in a direction perpendicular to the bristle tufts, in such a way that the area or surface occupied by the bristle ends of the brush was completely submitted to the action of the laser beam source.

The treated brush has been examined in a microscope and it has been found that the ends of all the bristles had a round shape, without sticking to each other, whereas the same brush not treated in accordance with this invention had pointed ends often provided with sharp prickles or splinters in the vicinity of said ends.

In other tests with tooth-brushes of the above described type, the bristles of the brushes have been submitted to a small vibration during 1 to 2 seconds and simultaneously to a laser beam emitter of the $CO_2$ type of a power of 50 to 100 watts placed under the bristle ends at about 4 cm from the latter. In a microscope, the bristle ends of the so treated tooth-brushes appeared perfectly round, without an noticeable damage of the material of the bristles.

FIG. 1 of the attached drawings shows schematically how the process described in the above examples has been practised.

In FIG. 1, a tooth brush 1 is maintained by any suitable means (not shown) in a horizontal position, so that the bristle tufts 2 are directed downwardly. At a suitable distance form the ends 3 of the bristle tufts 2 a source of heat rays, such as a source of laser beams 4 is placed. This laser beam source 4 can be moved along a horizontal guide shown by the line 5 in the direction of the arrows X, whereas the brush 1 may be subjected to vibrations by means of vibrating means 18 in contact with the brush.

As pointed out above, the source of laser beams may be maintained stationary, whereas the tooth brush is movable in a horizontal direction.

It is also possible to move both the tooth brush and the laser beam source simultaneously in opposite directions.

Of course, instead of possibly moving the source of laser beams, it is possible to displace the beams themselves, for example by means of a movable mirror, the source being maintained stationary.

An atmosphere or an aspiration stream of an inert gas, such as nitrogen, argon or helium, may be provided in the area of the bristles of the brush during the heat treatment thereof. When a stream of an inert gas is used, said stream is preferably directed in the direction of arrow Z.

Within the scope of this invention, the tooth-brush may also be oriented so as to extend perpendicularly to the position shown in FIG. 1 and may, in this case, be fixed or movable perpendicularly to the arrows X in front of a heat beam source.

FIGS. 2, 3 and 4 of the attached drawings show a tooth brush obtained by the process according to this invention, involving the formation of open capillary channels between a multiplicity of tangent monofilaments. FIG. 2 is a side view of a brush during the manufacture thereof, FIG. 3 being, at a larger scale, a partial section along to the lines III—III of FIG. 2 and FIG. 4 being a schematic perspective view illustrating the welding of the filaments to each other and to the head of the brush.

FIGS. 2 and 3 show a tooth-brush 1 according to this invention, comprising a handle 5 and a head 6. An elongated hole 7 is provided in said head 5, the length and the width of said hole 7 corresponding to the length and to the width of the bristle assembly 8. Said assembly 8 comprises a multiplicity or plurality of fine monofilaments 9 made of an organic thermoplastic synthetic material, which are parallel to each other and form between their tangent lines 10 capillary channels 11. These channels 11 are open at the free end 12 of the filaments 9 on the side of the front face 13 of the head 6, as well as at their opposite end 14 at the level of the back face 15 of this head. As shown by FIG. 3, the filaments 9 are arranged in rows of filaments, the axis of which are located on parallel lines both longitudinally and transversaly. Said filaments 9 may however be staggered. In a particular embodiment of the invention, the tooth-brush comprises about 1250 monofilaments 9 of nylon having a diameter of 0.2 mm crossing completely the hole 7 having a length of 1 cm and a width of 0.5 cm. FIG. 4 shows schematically in perspective a source of laser beams 16 movable in the direction of the arrows y which is parallel to a brush of the type described above with reference to FIGS. 2 and 3, said source of laser beams 16 being mounted at a predetermined distance of the tooth-brush. By moving the source 16 and/or the brush in the direction of the arrows Y, the laser beams emitted by the source 16, the power of which has been adjusted to a suitable value, cause the filaments to be welded together along their tangent lines 10 and along the lines 17 of contact (see FIG. 3) with the inner wall of the hole 7, without closing or obstructing the capillary channels 11 at their ends 14.

The invention is of course not limited to the above described details. Although reference is essentially made in the above description to tooth-brushes, this invention relates to any type of brush having bristles made of an organic thermoplastic synthetic material. 9n

I claim:

1. A process for obtaining a brush comprising a head supporting a multiplicity of monofilaments made of an organic thermoplastic synthetic material, such as nylon, said head comprising an elongated hole, and wherein said process comprises the steps of:

engaging said multiplicity of monofilaments into said elongated hole so that the monofilaments are tangent to each other all along their length and protrude the desired distance from one face of the head, severing or cutting flush said monofilaments with the opposite face of the head, and welding said monofilaments to each other and to said opposite face of the head so that open capillary channels are formed at both ends between the monofilaments.

2. The process according to claim 1, wherein the welding of the tangent filaments to each other and to the brush head is effected by submitting the ends of the monofilaments, on the side of the head opposite to the side where said monofilaments protrude, to the action of heat beams emitted by a source.

3. The process according to claim 2, wherein a source of laser beams is used.

4. The process according to claim 2, wherein the welding of the monofilaments along their tangent lines and their contact lines with the material of the head, along the edge of the hole provided therein, is effected by arranging the source of heat beams or rays above the back face opposite to the face carrying the protruding monofilaments of the head in front of the hole filled up with monofilaments and by causing a relative movement between said source and said head, the intensity of the heat source and the speed of the relative movement between the head and the source being adjusted so as to cause said welding without obstructing said capillary channels.

5. The process according to claim 1, further comprising the step of applying a fluid such as water in said capillary channels during the welding of the bristles to each other and to the opposite face of the head.

* * * * *